UNITED STATES PATENT OFFICE.

WILLIAM S. DEEDS, OF BALTIMORE, MARYLAND.

IMPROVEMENT IN SOLDERS.

Specification forming part of Letters Patent No. 119,080, dated September 19, 1871.

*To all whom it may concern:*

Be it known that I, WILLIAM S. DEEDS, of Baltimore, in the county of Baltimore and State of Maryland, have invented a new and useful Improved Composition for Soft Solder; and I do hereby declare that the following is a full, clear, and exact description thereof, sufficient to enable those skilled in the art to which my invention appertains to make and use the same.

The object of my invention is to produce a superior article of solder for the use of tinmen, can-makers, plumbers, roofers, and sheet, copper, and brass-workers; and my invention consists in making an alloy of certain metals to be used as a temper to the components of ordinary soft solder.

The metals I use in making the alloy or temper named are the alloy of about one part antimony, with about five parts grain or block-tin, with about six parts arseniureted lead, or lead treated with arsenic under the arsenic process for making shot. By adding the above alloy in different proportions to different proportions of tin and lead I obtain superior solders, the proportions varying according to the purpose for which the solder is intended.

When good soft solder of the number one or finest quality is cast in molds with one face exposed to the atmosphere while cooling, the face so exposed should, when cold, present a brilliant and rather silvery luster. When such condition is manifest, the solder will possess all the qualities requisite for a good number one or finest solder. Such condition belongs, however, alone to the number one, the others—such as roofers, can-makers, plumbers, &c., use—presenting different faces, according to the class to which they belong. But all solders should melt with equal facility in every part, and should contain no ingredient which will not conform to that condition. They should be good conductors, and cool rapidly when the heat supply is withdrawn, and should not be brittle thereafter. They should be ductile and yield to the expansion of the metals which they are used to unite; and they may be made to melt at different temperatures, according to the purposes for which they are intended. They should be of such a nature that they will combine readily with the metals which they are intended to unite. They must therefore have an affinity for them and form an alloy with them. They should expand, while cooling, so as to have the fissures well filled.

The excellence of soft solders depends on their possessing the abovementioned conditions; and my improvement supplies those conditions, as the following explanation will show: First, antimony, being a harder metal than either tin or lead, improves the solder in hardness and strength. It has a stronger affinity for both tin and lead than tin and lead have for each other. Therefore, acting as a medium between these metals, it forms a union of three metals not easily separated, and possessing superior strength when the proper proportions are used. Also, antimony alloyed with tin and lead forms a metal which expands while cooling, thereby leaving every crevice in the work well filled. Wherefore vessels soldered with it are less apt to leak than with tin and lead solder, which shrinks while cooling. It also unites the work more permanently for the reason that it has a strong affinity for tin. Second, lead treated with arsenic, or arseniureted lead, is more fusible, and more fluid when melted than ordinary lead. Therefore, when the same is in combination with the solder the whole is rendered more fusible and fluid. It acts as a medium between the least fusible metals to promote the fusibility and fluidity of the whole mass. It also assists in adding strength, because lead containing arsenic is much stronger and harder than ordinary lead. Third, when the alloy or temper is properly made it can be used in proper proportions to produce any of those qualities which may be requisite, according to the purpose for which they are intended—that is, a greater or less degree of hardness, of fusibility, of expansion, affinity, and luster.

The following is a suitable process for preparing the temper. Melt in a crucible, say about ten pounds of antimony. After the same has become fluid add about fifty pounds of grain or block-tin. Flux with charcoal, subject to a dark-red heat for about two hours, stirring frequently to incorporate the metals. The metal may then be cast in molds of the capacity of five or ten pounds.

To prepare the temper to be used to solder, melt any quantity of the above alloy of antimony and tin with an equal quantity of arseniureted lead, or lead treated with arsenic under the arsenic process for making shot. The temper will then be ready for use, and may be added in any quantity to any quantity and proportions of tin and lead, according to the quality of solder intended.

What I claim as new, and desire to secure by Letters Patent, is—

1. The combination of metallic antimony with the components of ordinary soft solder, substantially as described, for the purpose specified.

2. The combination of arseniureted lead with the components of ordinary soft solder to produce a superior solder, substantially as described, for the purpose specified.

3. The employment of the alloy of antimony, arseniureted lead, and tin as a temper to ordinary soft solder for its improvement, substantially as described and for the purpose specified.

WM. S. DEEDS.

Witnesses:
FRANCIS D. PASTORIUS,
JOHN S. CORNNELL. (112.)